United States Patent
Jalloul et al.

(10) Patent No.: US 9,397,876 B2
(45) Date of Patent: Jul. 19, 2016

(54) SYNCHRONIZATION AND FRAME STRUCTURE DETERMINATION OF A BASE STATION

(75) Inventors: Louay Jalloul, Santa Clara, CA (US); Djordje Tujkovic, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1098 days.

(21) Appl. No.: 12/696,719

(22) Filed: Jan. 29, 2010

(65) Prior Publication Data

US 2010/0215032 A1 Aug. 26, 2010

Related U.S. Application Data

(60) Provisional application No. 61/208,199, filed on Feb. 20, 2009, provisional application No. 61/215,744, filed on May 8, 2009.

(51) Int. Cl.
| | |
|---|---|
| *H04J 3/06* | (2006.01) |
| *H04L 27/26* | (2006.01) |
| *H04W 56/00* | (2009.01) |
| *H04W 92/20* | (2009.01) |

(52) U.S. Cl.
CPC ........ *H04L 27/2692* (2013.01); *H04L 27/2646* (2013.01); *H04L 27/2655* (2013.01); *H04W 56/0045* (2013.01); *H04W 92/20* (2013.01)

(58) Field of Classification Search
CPC ... H04L 5/0035; H04L 5/0055; H04L 5/0057; H04L 12/2869; H04L 12/5695; H04L 47/00; H04L 47/70; H04L 47/78; H04L 47/821; H04L 47/827; H04W 72/04
See application file for complete search history.

(56) References Cited

U.S. PATENT DOCUMENTS

| | | | | |
|---|---|---|---|---|
| 6,912,210 | B1 * | 6/2005 | Uchiba et al. | 370/300 |
| 2003/0072255 | A1 * | 4/2003 | Ma et al. | 370/208 |
| 2005/0018638 | A1 * | 1/2005 | Lindskog et al. | 370/338 |
| 2005/0226191 | A1 * | 10/2005 | Golestani et al. | 370/338 |
| 2008/0232278 | A1 * | 9/2008 | Brunel et al. | 370/275 |
| 2008/0285539 | A1 * | 11/2008 | Tiedemann et al. | 370/350 |
| 2009/0185632 | A1 * | 7/2009 | Cai et al. | 375/260 |
| 2010/0027525 | A1 * | 2/2010 | Zhu | 370/350 |
| 2010/0029295 | A1 * | 2/2010 | Touboul et al. | 455/456.1 |
| 2010/0061326 | A1 * | 3/2010 | Lee et al. | 370/329 |
| 2010/0087206 | A1 * | 4/2010 | Touboul et al. | 455/456.1 |
| 2010/0110983 | A1 * | 5/2010 | Fu | 370/328 |
| 2010/0111047 | A1 * | 5/2010 | Yang et al. | 370/336 |
| 2013/0010628 | A1 * | 1/2013 | Viorel et al. | 370/252 |

\* cited by examiner

*Primary Examiner* — Jung-Jen Liu
(74) *Attorney, Agent, or Firm* — Sterne, Kessler, Goldstein & Fox P.L.L.C.

(57) ABSTRACT

A method and apparatus of synchronization and frame structure determination of a base station are disclosed. One method includes the base station determining an initial frame structure including an active region and a dummy region, wherein the regions are sets of OFDM symbols. The base station receives timing information from at least one of a mobile station and a second base station, wherein the mobile station is simultaneously communicating with the base station and the second base station. The base station adjusts its frame structure based at least in part on the timing information, wherein adjusting its frame structure includes at least one of adjusting the active region and the dummy region. The base station adjusts its internal timing to improve synchronization with the second base station based on the timing error information.

23 Claims, 7 Drawing Sheets

```
┌─────────────────────────────────────────────────────────────────┐
│ The base station determining an initial frame structure including an active region │
│   and a dummy region, wherein the regions include sets of OFDM symbols             │
│                                                                 │
│                              510                                │
└─────────────────────────────────────────────────────────────────┘
                                │
                                ▼
┌─────────────────────────────────────────────────────────────────┐
│   The base station receiving timing information from at least one of a mobile     │
│ station and a second base station, wherein the mobile station is simultaneously   │
│          communicating with the base station and the second base station          │
│                                                                 │
│                              520                                │
└─────────────────────────────────────────────────────────────────┘
                                │
                                ▼
┌─────────────────────────────────────────────────────────────────┐
│ The base station adjusting its frame structure based at least in part on the timing │
│     information, wherein adjusting its frame structure comprises at least one of    │
│                 adjusting the active region and the dummy region                    │
│                                                                 │
│                              530                                │
└─────────────────────────────────────────────────────────────────┘
                                │
                                ▼
┌─────────────────────────────────────────────────────────────────┐
│ The base station adjusting its internal timing to improve synchronization with the │
│              second base station based on the timing error information             │
│                                                                 │
│                              540                                │
└─────────────────────────────────────────────────────────────────┘
```

FIGURE 5

SYNCHRONIZATION AND FRAME STRUCTURE DETERMINATION OF A BASE STATION

RELATED APPLICATIONS

This patent application claims priority to U.S. provisional patent application Ser. Nos. 61/208,199 filed on Feb. 20, 2009 and 61/215,744 filed May 8, 2009 which are incorporated by reference.

FIELD OF THE INVENTION

The invention relates generally to wireless communications. More particularly, the invention relates to a method and apparatus for synchronization and frame structure determination of a base station.

BACKGROUND OF THE INVENTION

In telecommunications, a femtocell—originally known as an Access Point Base Station—is a small base station, typically designed for use in a home or small business. The femtocell incorporates the functionality of a typical base station but extends it to allow a simpler, self-contained deployment.

For a mobile operator or a service provider, the attractions of a femtocell are improvements to both coverage and capacity, especially indoors. Femtocells can provide opportunity for new services and reduced cost. The mobile operator not only benefits from the improved capacity and coverage but also can reduce both capital expenditure and operating expense.

A typical situation includes system base stations being located outside, and the femtocells being located indoors. The system base stations are typically synchronized to a network (such as, global positioning system (GPS) signals), wherein the system base station can include any one of a macro, micro or pico base station that is synchronized to GPS. Because the base stations are synchronized, the base stations are able to synchronize their communications, and therefore, minimize the overall interference between themselves and any mobile unit connected to the base stations. However, femtocells are frequently located indoor and cannot receive global positioning system (GPS) signals, and therefore, are not tightly synchronized to the rest of the network.

Femtocells are typically simplified and low power base stations. The femtocells typically have lower coverage than system base stations and are IP-backhaul connected through a local broadband connection such as DSL, cable, PON or a fixed wireless backhaul. As mentioned, being located indoors, femtocells generally cannot receive GPS signals. Therefore, a femtocell in a time division duplex (TDD) systems (such as WiMAX) lack precise timing synchronization and can cause interference between wireless transmissions of femtocell and base stations.

It is desirable to have a method and apparatus for improving synchronization of femtocells to base stations of a network, and to reduce interference in the network.

SUMMARY OF THE INVENTION

An embodiment includes a method of synchronization and frame determination of a base station. The method includes the base station determining an initial frame structure including an active region and a dummy region, wherein the regions include sets of OFDM symbols. The base station receives timing information from at least one of a mobile station and a second base station, wherein the mobile station is simultaneously communicating with the base station and the second base station. The base station adjusts its frame structure based at least in part on the timing information, wherein adjusting its frame structure includes at least one of adjusting the active region and the dummy region. The base station adjusts its internal timing to improve synchronization with the second base station based on the timing error information.

Another embodiment includes a method of frame determination of a base station. The method includes the base station determining an initial frame structure including an active region and a dummy region upon powering up, wherein the regions include sets of OFDM symbols. The base station receives timing information from at least one of a mobile station and a second base station, wherein the mobile station is simultaneously communicating with the base station and the second base station. The base station adjusts its frame structure based at least in part on the timing information, wherein adjusting its frame structure comprises at least one of adjusting the active region and the dummy region.

Another embodiment includes a method of synchronization of a base station. The method includes the base station receiving timing information from at least one of a mobile station and a second base station, wherein the mobile station is simultaneously communicating with the base station and the second base station. The base station adjusts its internal timing to improve synchronization with the second base station based on the timing error information.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 is a flow chart that includes steps of an example of a method of synchronization and frame determination of a base station.

DETAILED DESCRIPTION

Method and apparatuses for improving synchronization of femtocells are disclosed. Embodiments include a base station (for example, a femtocell base station) receiving timing information from at least one of a mobile station and a second base station. Based on the timing information, the base station can adjust its frame structure and/or its internal timing to reduce system interference and to improve synchronization of the base station with the second base station.

Figure 1:
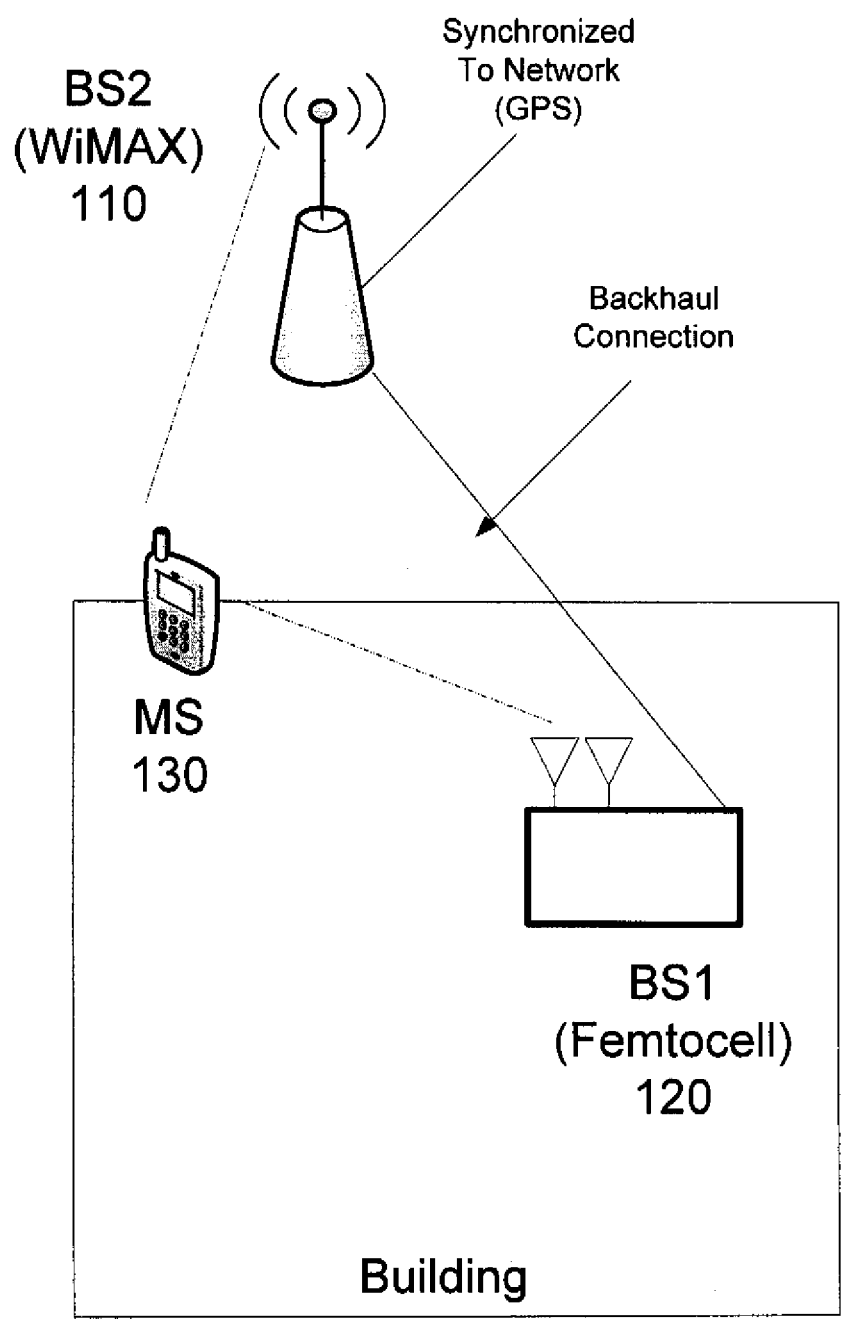
FIG. 1 an example of the femtocell base station, a mobile station and a WiMAX base station.

FIG. 1 an example of a WiMAX base station 110, a femtocell base station 120, and a mobile station 130. As shown, the WiMAX base station 110 is synchronized to a network. WiMAX base stations are typically located outdoors, and are typically synchronized to GPS satellite signals. WiMAX communications between base stations and mobile stations are scheduled, and the transmissions occur within downlink and uplink sub-frames according to the schedule. The timing of the downlink and uplink frames is dependent on synchronized internal clocks of the WiMAX base stations, which as previously stated, are synchronized to GPS signal.

The femtocell base stations are typically located indoors, and cannot receive GPS satellite signals. The femtocells are typically IP-backhaul connected through a local broadband connection such as DSL, cable, PON or a fixed wireless backhaul. Therefore, the downlink and uplink frames of the femtocell base stations are typically not synchronized to GPS signals. As a result, interference can occur between WiMAX base stations and femtocell base stations. Though shown in FIG. 1 as WiMAX base stations and femtocell base stations, the lack of synchronization between different types of base stations is common to systems that include the coexistence of unsynchronized base stations in a wireless network.

Figure 2:
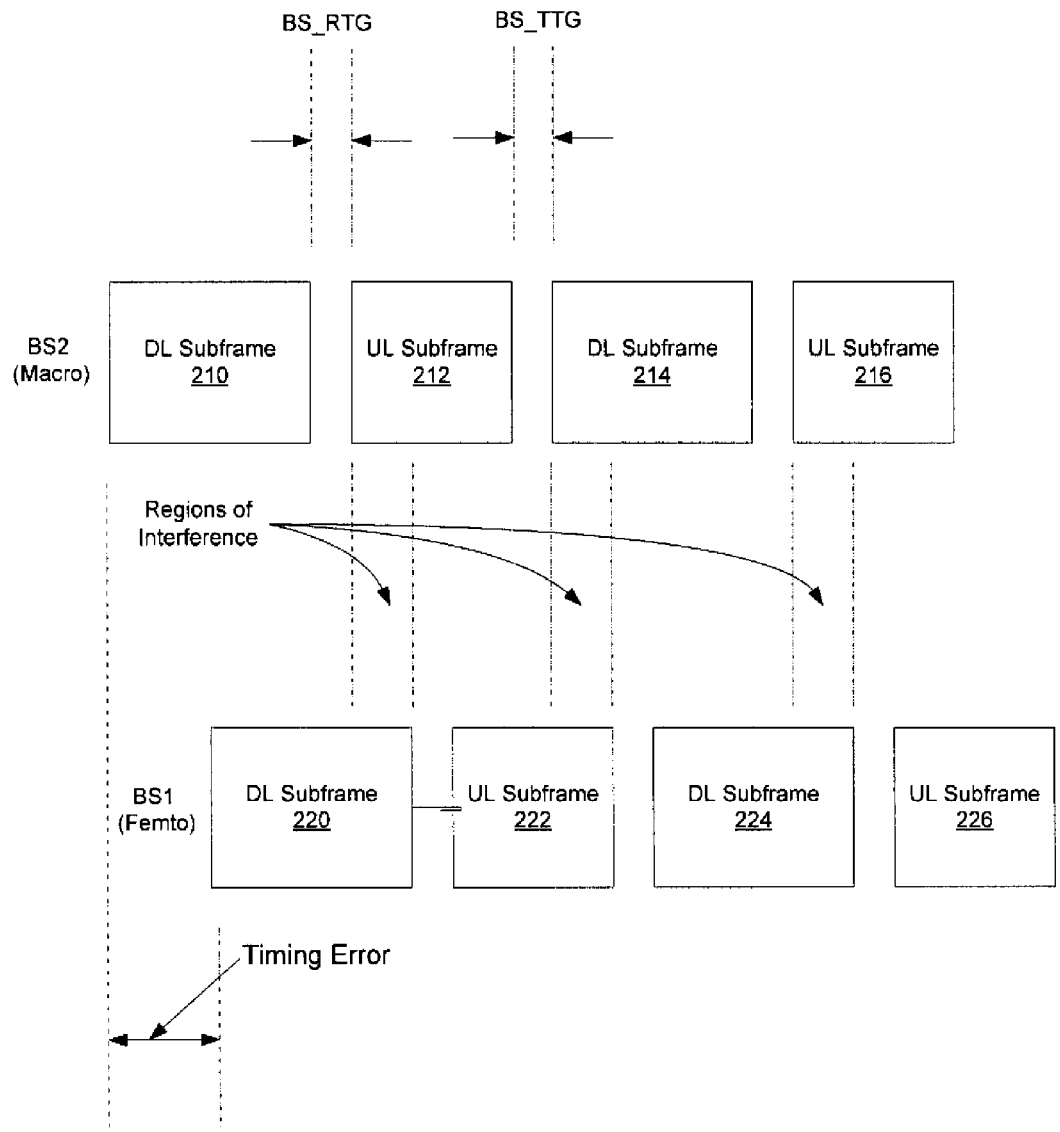
FIG. 2 shows a time-line that depicts potential interference problems due to a lack of synchronization between the femtocell base station and the WiMAX base station.

FIG. 2 shows a time-line that depicts potential problems due to a lack of synchronization, for example, between the femtocell base station and the WiMAX base station. Due to a lack of synchronization with a network like the WiMAX base station, the transmission frames of the femtocell base station can be mis-aligned with respect to the transmission frames of the WiMAX base station.

As shown in FIG. 2, BS2 (macro) base station downlink (DL) frames 210, 214 and uplink (UL) frames 212, 216 occur at certain times. As described, if the BS2 is a WiMAX base station, the frames are synchronized, for example, to GPS signals. Guard bands BS_RTG, BS_TTG are located between the sub-frames.

Also as shown in FIG. 2, BS1 (femto) DL frames 220, 224, and UL frames 222, 226 occur at different times. The BS1 is not synchronized to the same references (UPS) as the BS2. Therefore, timing mis-alignments occur between the frames 210, 212, 214, 216 of the BS2 and the frames 220, 222, 224, 226 of the BS1. The mis-alignments cause the scheduled data of the frames to interfere with each other. Regions of potential interferences are indicated in FIG. 2. Without any changes to the operation of the transmissions, two adjacent cells (one cell formed by the first base station BS1, and another cell formed by the second base station BS2) will interfere with each other whenever the timing error T between the adjacent cells is larger than +−min(RTG, TTG)/2. For a WiMAX base station and a WiMAX femtocell, typical numbers for timing uncertainty in unsynchronized femtocells are in the range of T=+/− 100 usec. Therefore, interference is inevitable without additional measures being taken to reduce the possibility of interference.

Figure 3:
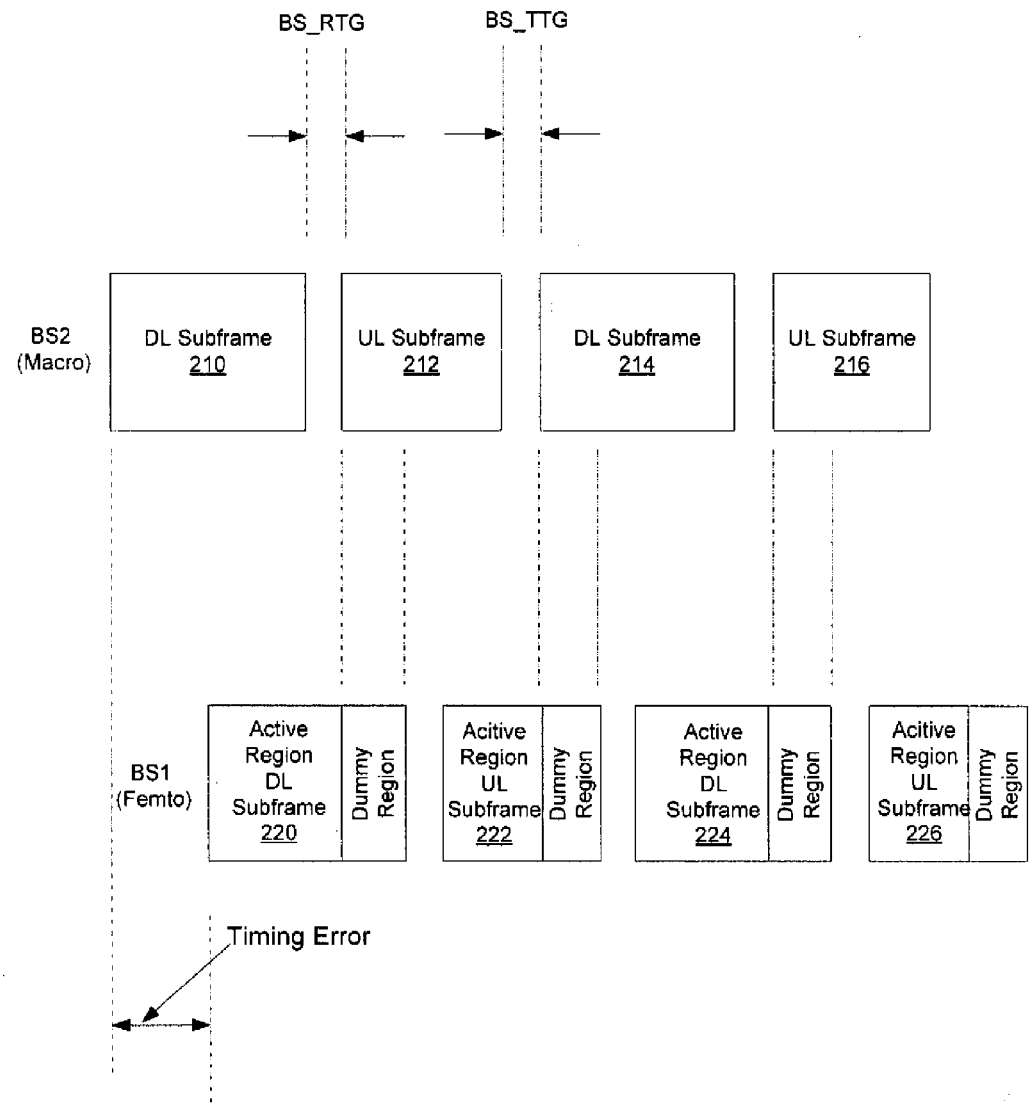
FIG. 3 shows an example of a frame structure that includes active regions and dummy regions.

FIG. 3 shows an example of a frame structure that includes designated active regions and dummy regions. The active and dummy regions of the DL sub-frame and the UL sub-frame can be allocated during scheduling. For one embodiment, the allocation of the regions can be dependent upon a maximum expected uncertainty in timing between a first base station (for example, a WiMAX femtocell base station) and a second base station (such as, a WiMAX base station). If the maximum expected uncertainty in the timing between the femtocell base station and the macrocell base station is +/−Tmax, one embodiment includes intentionally introducing a bias in the timing of the femtocell base station by delaying the start time of its frame by Tmax+δ where δ is a suitable constant to account for the maximum time of flight propagation difference between the femtocell base station and the macrocell base station. This assures that transmission signals transmitted by the femtocell base station always arrive delayed at a receiving mobile station as compared to a transmission signal being receiving from the macrocell base station. Alternatively, the femtocell base station can avoid scheduling any data or pilot transmissions in the last determined N DL and UL OFDM symbols within the femtocell transmission frames, where:

$$N = \left\lceil \frac{2*T\max + \delta}{T\_ofdm} \right\rceil,$$

where T_ofdm denotes an OFDM symbol duration, and Tmax and δ are as previously defined. This can be more generalized by arbitrary grouping of allocated resources of femtocells base stations and macrocell base stations to avoid interference.

Tmax can be measured during the network cell planning and deployment. Tmax can vary depending on loading of a backhaul connection between base stations, and on a number of layers of switches used in a reference clock distribution network.

δ is typically based on an expected radio network coverage, which can be determined at deployment through cell planning. Additionally, δ includes the previously mentioned RTG and TTG.

Figure 4:
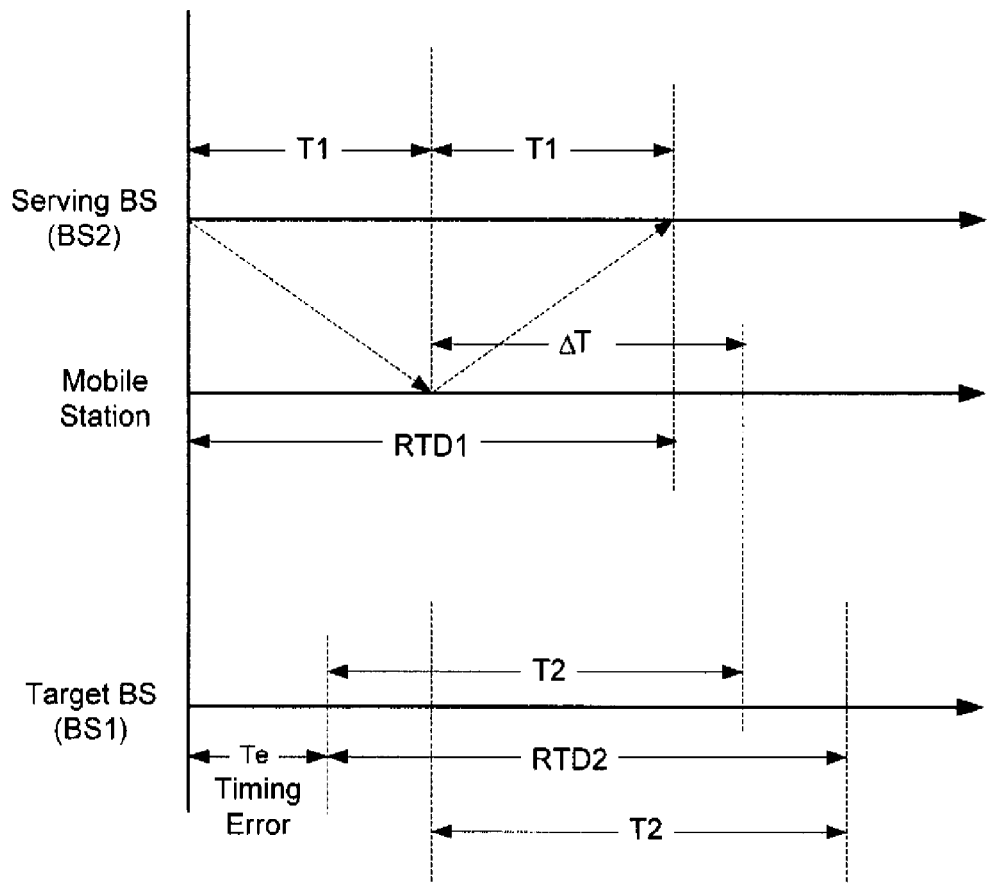
FIG. 4 shows an example of a time-line of the timing of transmissions between a base station (such as a femtocell) and a mobile station, and between a second base station (such as a WiMAX base station) and the mobile station.

FIG. 4 shows an example of a time-line of the timing of transmissions between a base station and a mobile station, and between a second base station and the mobile station. As shown, a time T1 denotes a transmission time between a serving base station (second base station BS2) and a mobile station. A round trip delay of transmission between the serving base station and the mobile station is denoted RTD1 and is equal to 2*T1.

As shown, a time T2 denotes a transmission time between a target (femtocell) base station (first base station BS1) and the mobile station. A round trip delay of transmission between the target base station and the mobile station is denoted RTD2 and is equal to 2*T2.

A time ΔT denotes the time difference between T2 and T1. Te denotes a timing error between the target (first) base station and the serving (second) base station.

Embodiments include the mobile station wirelessly communicating with the first base station and the second base station. Additionally, embodiments include the first base station being connected (typically wired, but could be wireless) through a backhaul connection to the second base station. Therefore, each of the first base station, the second base station or the mobile base station can calculate and/or determine each of these timing parameters with the proper timing information.

Observation of FIG. 2 suggests:

T1+T2=RTD2+Te;

T1+ΔT=Te+T2; and

Te can be determined to be:

Te=(RTD1RTD2+ΔT)/2.

Based on Te, the first base station BS1 can correct its timing relative to BS2. That is, the first base station BS1 can adjust timing of its internal clock accordingly.

A specific embodiment of determination of Te includes, the mobile station measuring T1 and T2. The second base station BS2 determines RTD1 and the first base station determines RTD2. The second base station BS2 transfers its RTD1 measurement to the first base station BS1. The mobile station MS sends ΔT=T2−T1 to the first base station BS1. The first base station BS1 computes Te=(RTD1−RTD2+ΔT)/2, and the first base station shifts its timing by Te.

FIG. 5 is a flow chart that includes steps of an example of a method of synchronization and frame determination of a base station. A first step 510 includes the base station determining an initial frame structure including an active region and a dummy region, wherein the regions include sets of OFDM symbols. This can be performed, for example, at powering up of the first base station. A second step 520 includes the base station receiving timing information from at least one of a mobile station and a second base station, wherein the mobile station is simultaneously communicating with the base station and the second base station. A third step 530 includes the base station adjusting its frame structure based at least in part on the timing information, wherein adjusting its frame structure comprises at least one of adjusting the active region and the dummy region. A fourth step 540 includes the base station adjusting its internal timing to improve synchronization with the second base station based on the timing error information.

For an embodiment, the active regions designate a set of OFDM symbols within a frame in which the mobile station and the base station can transmit or receive signals. Additionally, the dummy regions designate a set of OFDM symbols within a frame in which the mobile station and the base station cannot transmit or receive signals. For a more specific embodiment, the frame structure includes a downlink sub-frame and an uplink sub-frame, and the downlink sub-frame and the uplink sub-frame each include an active region and a dummy region.

Generally, the active region and the dummy region are selected to minimize interference between frames of the base station and the second base station. More specifically, the dummy region is determined based on a priori system design information. The priori system design information can include, for example, the previously described Tmax and δ.

A typical embodiment includes the second base station being synchronized to a network, and the base station not being synchronized to the network. More specifically, an embodiment includes the second base station being synchronized to the network through reception of global positioning system (GPS) signals.

An embodiment includes reliability of the timing information being determined at least in part by characterizing a signal quality metric of signals received by the mobile station from the base station and the second base station, and signals received by the second base station from the mobile station. Exemplary signal quality metrics include signal to interference-plus-noise ratio (SINR) or receive signal strength indicator (RSSI).

Another embodiment includes the second base station determining a reliability of the round trip delay between the second base station and the mobile station, wherein the reliability of the round trip delay is determined based on a signal quality metrics of the signals received at the second base station from the mobile station. If the reliability of the round trip delay is below a threshold, then the base station adjusts the frame structure. The threshold may be determined by estimating interference plus noise levels at the second base station. The threshold may be adapted based on a symbol of bit error rate of the data signals received by the second base station from the mobile station. Additionally, if a difference between a measurement of a transmission time between the second base station and the mobile station and an a measurement of a transmission time between the base station and the mobile is positive, the base station delays its transmission time by an amount proportional to the difference between the measurement of the transmission time between the second base station and the mobile station and the transmission time between the base station and the mobile station.

For an embodiment, the base station receiving a timing information from at least one of a mobile station and a second base station includes the base station receiving a round trip delay time of signal transmission between the mobile station and the second base station, or timing information allowing the base station to determined the round trip delay time of signal transmission between the mobile station and the second base station. A specific embodiment includes the base station receiving this round trip delay (RTD2) from the mobile station. Another specific embodiment includes the mobile station receiving this round trip delay (RTD2) from the second base station through, for example, a backhaul connection. Additionally, the base station receives a ΔT or information required to determine the ΔT, wherein ΔT represents a timing difference between signal transmission between the mobile station and the base station and signal transmission between the mobile station and the second base station. Specific embodiments include the base station receiving ΔT from either the second base station or the mobile base station. Clearly, the first base station can calculate ΔT as well if provided with the required information. Finally, the base station receives timing information allowing the base station to determine a round trip delay time of signal transmission between the mobile station and the base station, or base station receives a round trip delay time of signal transmission between the mobile station and the base station.

For an embodiment, the base station determining a timing error of the base station based on the round trip delay time of signal transmission between the mobile station and the second base station, the round trip delay time of signal transmission between the mobile station and the base station, and ΔT. Based on the timing error, the base station can adjust its frame structure based at least in part on the timing error, and/or the base station can adjust its internal timing to improve synchronization with the second base station based on the timing error.

As has been described, an embodiment includes the base station being a femtocell cell base station and the second base station being a WiMAX base station.

Figure 6:
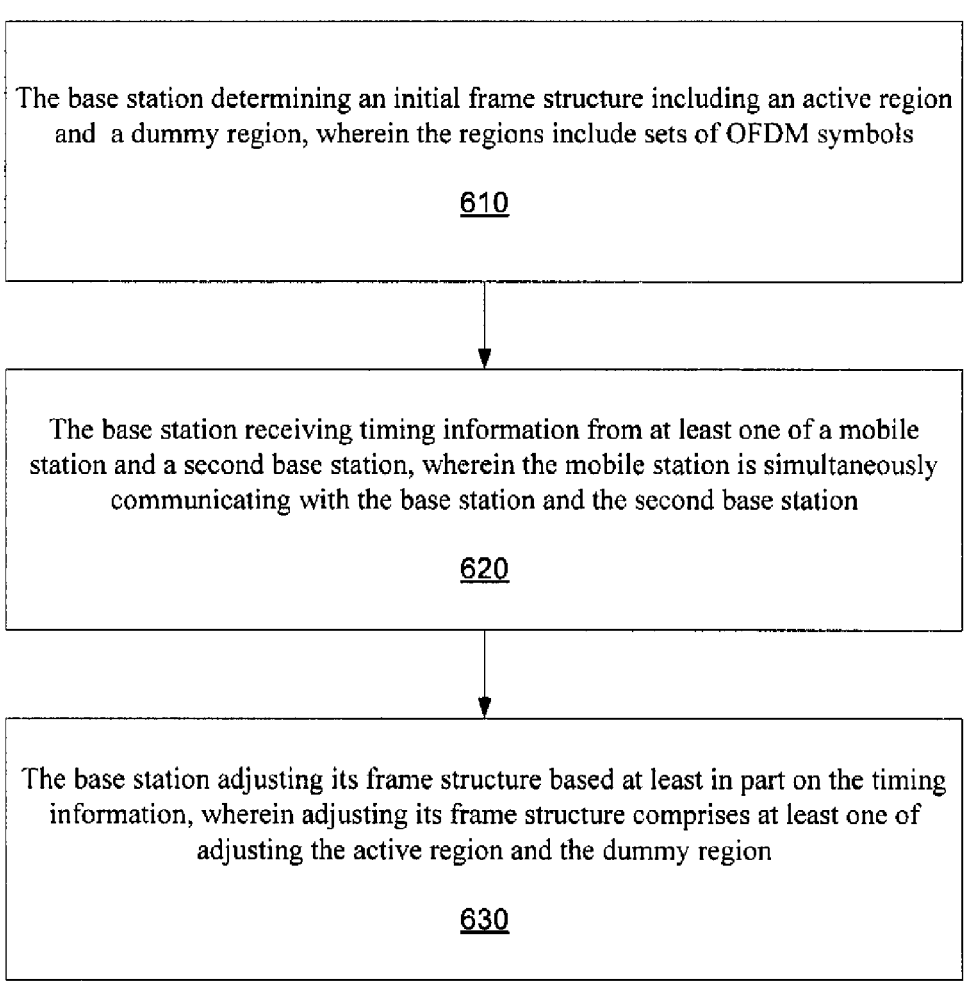
FIG. 6 is a flow chart showing steps of one example of a method of frame determination of a base station.

FIG. 6 is a flow chart showing steps of one example of a method of frame determination of a base station. A first step 610 includes the base station determining an initial frame structure including an active region and a dummy region upon powering up, wherein the regions include sets of OFDM symbols. A second step 620 includes the base station receiving timing information from at least one of a mobile station and a second base station, wherein the mobile station is simultaneously communicating with the base station and the second base station. A third step 630 includes the base station adjusting its frame structure based at least in part on the timing information, wherein adjusting its frame structure comprises at least one of adjusting the active region and the dummy region.

Figure 7:
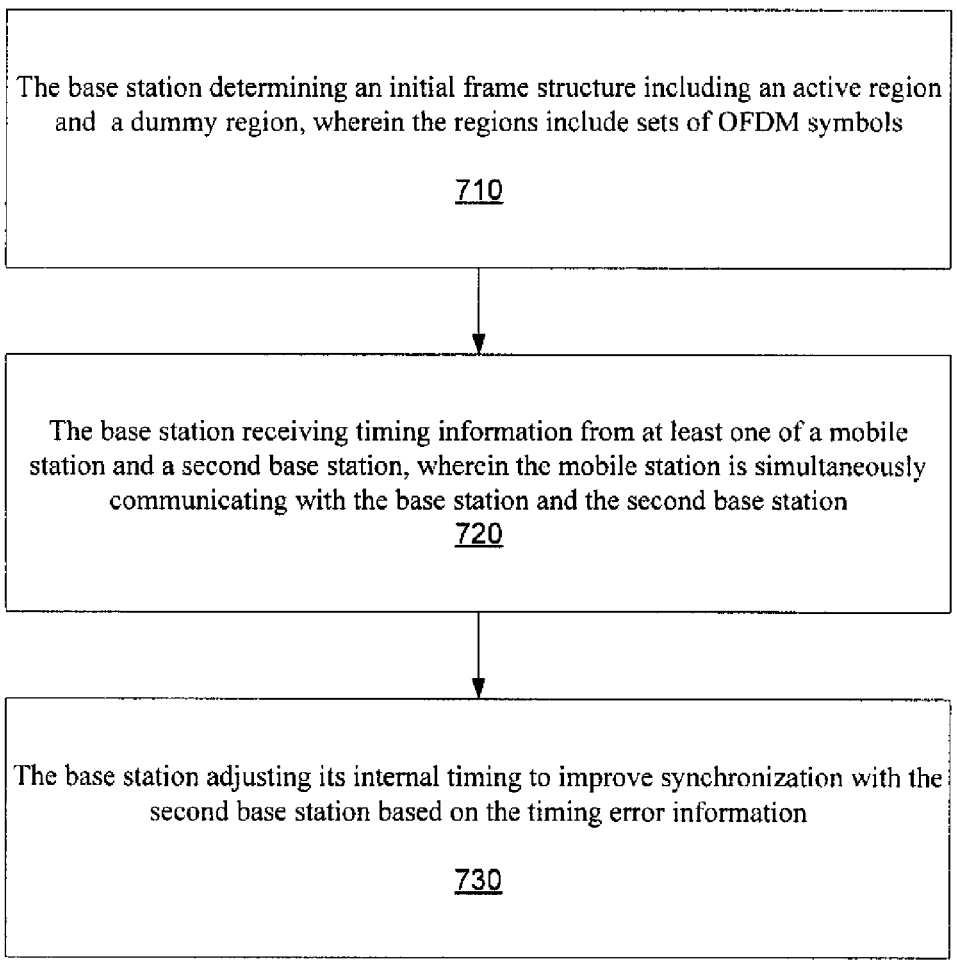
FIG. 7 is a flow chart that includes steps of an example of a method of synchronization of a base station.

FIG. 7 is a flow chart that includes steps of an example of a method of synchronization of a base station. A first step 710 includes the base station receiving timing information from at least one of a mobile station and a second base station, wherein the mobile station is simultaneously communicating with the base station and the second base station. A second step 720 includes the base station adjusting its internal timing to improve synchronization with the second base station based on the timing error information.

Although specific embodiments have been described and illustrated, the disclosed embodiments are not to be limited to the specific forms or arrangements of parts so described and illustrated. The disclosed embodiments are limited only by the appended claims.

What is claimed:

1. A method comprising:
   determining, by a base station, a frame structure including an active region and a dummy region;
   receiving, by the base station, a round trip delay time of a signal transmission between a mobile station and a second base station;
   determining, by the base station, a second round trip delay between the base station and the mobile station;
   receiving a timing difference from the mobile station, the timing difference being based on a first transmission time between the base station and the mobile station and a second transmission time between the second base station and the mobile station;
   determining, by the base station, a timing error based on the round trip delay time, the second round trip time, and the timing difference; and
   adjusting, by the base station, a size of the dummy region based on the timing error.

2. The method of claim 1, wherein the active region designates a set of orthogonal frequency-division multiplexing (OFDM) symbols within the frame structure in which the mobile station and the base station communicate.

3. The method of claim 1, wherein the dummy region designates a set of orthogonal frequency-division multiplexing (OFDM) symbols within the frame structure in which the mobile station and the base station cannot communicate.

4. The method of claim 1, wherein the frame structure comprises a downlink subframe and an uplink sub-frame, and
   wherein at least one of: the downlink sub-frame and the uplink sub-frame comprise the active region and the dummy region.

5. The method of claim 1, wherein the active region and the dummy region are selected to minimize interference between frames of the base station and the second base station.

6. The method of claim 1, wherein the dummy region is determined based on a priori system design information.

7. The method of claim 1, wherein the second base station is synchronized to a network, and
   wherein the base station is not synchronized to the network.

8. The method of claim 7, wherein the second base station is synchronized to the network through reception of global positioning system (GPS) signals.

9. The method of claim 1, further comprising:
   determining, by the base station, reliability of timing information by characterizing a signal quality metric of signals received by the mobile station from the base station and the second base station and signals received by the second base station from the mobile station.

10. The method of claim 1, wherein the base station is a femtocell base station and the second base station is a WiMAX base station.

11. The method of claim 1, further comprising:
    receiving, by the base station, a reliability of the round trip delay between the second base station and the mobile station based on a signal quality of a signal received at the second base station from the mobile station;
    adjusting, by the base station, the frame structure when the reliability of the round trip delay is below a threshold; and
    delaying, by the base station, a transmission time of the base station by an amount proportional to the timing difference between the first transmission time and the second transmission time when the difference between the first transmission time and the second transmission time is positive.

12. The method of claim 1, wherein the receiving the round trip delay time comprises:
    receiving the round trip delay time of the signal transmission between the mobile station and the second base station or timing information allowing the base station to determine the round trip delay time of the signal transmission between the mobile station and the second base station; and
    receiving a timing difference between a signal transmission between the mobile station and the base station and the signal transmission between the mobile station and the second base station, wherein the determining the timing error comprises:
    determining the timing error based on the timing difference.

13. A method of frame structure determination of a base station, comprising:
    determining, by the base station, a frame structure including an active region and a dummy region;
    receiving, by the base station, timing information from at least one of: a mobile station and a second base station;
    determining, by the second base station, a reliability of a round trip delay between the second base station and the mobile station based on a signal quality of a signal received at the second base station from the mobile station;
    adjusting, by the base station, the frame structure when the reliability of the round trip delay is below a threshold; and
    delaying, by the base station, a transmission time by an amount proportional to a difference between a measurement of a first transmission time between the second base station and the mobile station and a second transmission time between the base station and the mobile station when the difference between the first transmission time and the second transmission time is positive.

14. A method of frame structure determination of a base station, comprising:
    determining, by the base station, a frame structure including an active region and a dummy region;
    receiving, by the base station, a round trip delay time of a signal transmission between a mobile station and a second base station, or timing information allowing the base station to determine the round trip delay time of the signal transmission between the mobile station and the second base station;
    receiving, by the base station, a timing difference between a signal transmission between the mobile station and the base station and the signal transmission between the mobile station and the second base station or information to determine the timing difference;
    receiving, by the base station, timing information allowing the base station to determine a round trip delay time of the signal transmission between the mobile station and the base station or the timing information allowing the base station to determine the round trip delay time of signal transmission between the mobile station and the second base station; and adjusting, by the base station, a frame structure based on the timing difference and the timing information.

15. The method of claim 14, further comprising:
determining, by the base station, a timing error of the base station based on the round trip delay time of the signal transmission between the mobile station and the second base station, the round trip delay time of the signal transmission between the mobile station and the base station, and the timing difference.

16. The method of claim 15, wherein the adjusting further comprises:
adjusting the frame structure based on the timing error.

17. The method of claim 15, further comprising:
adjusting, by the base station, an internal timing to improve synchronization with the second base station based on the timing error.

18. A system for synchronizing a base station, comprising:
a first base station configured to determine a first round trip delay between the first base station and a mobile station; and
a second base station configured to:
receive the first round trip delay from the first base station,
determine a second round trip delay between the second base station and the mobile station,
receive a timing difference from the mobile station, the timing difference being based on a first transmission time between the first base station and the mobile station and a second transmission time between the second base station and the mobile station,
compute a timing error based on the first round trip delay, the second round trip delay, and the timing difference, and
adjust a frame structure of the second base station based on the timing error to synchronize its timing with the first base station.

19. The system of claim 18, wherein the frame structure of the second base station comprises an active region and a dummy region, and wherein the second base station is configured to adjust a size the active region and a size of the dummy region to minimize interference between frames of the first base station and the second base station.

20. The system of claim 18, wherein: the first base station is further configured to determine a reliability of the first round trip delay based on a signal quality metric of a signal received at the first base station from the mobile station; and wherein the second base station is further configured to adjust frame structure of the second base station when the reliability of the first round trip delay is below a threshold.

21. The system of claim 20, wherein the threshold is determined based on an estimation of interference and noise levels at the first base station.

22. The system of claim 18, wherein the second base station is further configured to delay a transmission time by an amount proportional to the timing difference when the timing difference is positive.

23. The system of claim 18, wherein the second base station is further configured to receive timing information allowing the second base station to determine the first round trip delay time of a signal transmission between the mobile station and the first base station.

* * * * *